United States Patent Office 3,535,298
Patented Oct. 20, 1970

3,535,298
POLYMERIZATION OF VINYL CHLORIDE AND ITS COMONOMERS
Michel Marbach, Lyon, and Jacques Brivet, Bron, France, assignors to Produits Chimiques Pechiney-Saint-Gobain, Neuilly-sur-Seine, France
No Drawing. Filed Oct. 23, 1968, Ser. No. 770,061
Claims priority, application France, Oct. 24, 1967, 125,634
Int. Cl. C08f 3/30, 15/08
U.S. Cl. 260—85.5          6 Claims

ABSTRACT OF THE DISCLOSURE

A new system of catalytic initiators includes alpha-halogeno diacyl peroxides and titanium compounds in a state of oxidation capable of reducing the peroxide, of which titanium salts of mineral acids are exemplary. The qualities of the polymer are improved with respect to those obtained by the use of peroxide alone and the temperature of reaction can be commercially carried out at those lower temperatures which produce superior products.

---

This invention relates to the manufacture of polyvinyl chloride and particularly to the processes of polymerization in mass or in a liquid medium in which the monomer is miscible but the polymers are insoluble and are precipitated as they form. The word "polymerization" includes both homopolymerization and copolymerization with compatible monomers of other classes. The term "in mass" means polymerization in the absence of solvents, diluents, and other additives than a trace of catalyst and is equivalent in meaning to the term "in bulk." Processes in mass are autoclave processes because vinyl chloride is a gas at ordinary temperature and it is advantageous except in certain special processes to carry out the process with vinyl chloride in liquid phase. Polymerization in precipitating medium (which is frequently alcohol medium) may be autoclave or ordinary pressure processes depending on the nature of the medium.

Polymerization has been carried out by numerous processes at various temperatures; many processes are efficient at temperatures of about 50–60° C., such as those employing lauroyl peroxide, but it has been observed that the low temperature processes produce products having desirably superior properties, such as crystallinity. Good products have been obtained by the processes set forth in French Pats. 1,475,890 of Feb. 23, 1966, and 1,483,018 of which both polymerize in the presence of alpha halogeno organic peroxides, the peroxides of the first group being alpha-halogenolauroyl peroxides, the formula of the second group being

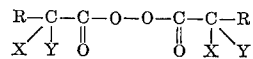

in which X is halogen, Y is halogen or hydrogen, R is a saturated or unsaturated hydrocarbon radical of from 1–9 C atoms, or cycloalkane, cycloalkene, aromatic, or heterocyclic. R may also be substituted, for instance by halogen. The temperatures used in the first patent are from −15° to 35° C., preferably +10° to +25° C., and in the second from −40° to +40° C. and preferably −15° to 35° C. The temperature range is also affected by particular members of the class, being from 20° to 35° C. for alpha chloroprionyl peroxide, from 10° to 25° C. for alpha chlorocaproyl peroxide, and −2° to 12° C. for dichloropropionyl peroxide.

The polymers produced by those processes are of good quality and quite satisfactory but it is an object of this invention to improve them, in particular with respect to strength (measured by resistance to traction), bending temperature, softening temperature, and resistance to halogenated solvents such as dichloroethylene and trichloroethylene.

The objects of the invention have been achieved by lowering the range of temperatures of efficient polymerization and this has been achieved by polymerizing monomer comprising vinyl chloride in mass or precipitating medium activated by a catalyst initiator of the formula

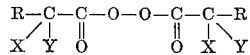

in which X is halogen, e.g. Cl, Br, F, I; Y is hydrogen or halogen; R is an aliphatic hydrocarbon radical, saturated or unsaturated, containing 1–10 C atoms which may carry such substituents as halogen, cyclanic, cyclenic, aromatic or heterocyclic radicals of which the radicals may also carry substituents such as halogen, in admixture with a mineral titanium compound in a state of oxidation such that it will reduce the alpha halogenated diacyl peroxide. The titanium compound is advantageously put into the reaction mass as a solution in an alcohol such as methanol, ethanol, isopropanol, and butanol.

Among the alpha halogenated diacyl peroxides that have proven useful are the dichloropropionyl, chlorocapropyl, chlorolauroyl, chlorobutyroyl, chloropropionyl, chlorocapryl, chlorovaleryl, chloroheptanoyl, and chloroundecanoyl.

Among the mineral titanium compounds used successfully are the titanium trichloride, trifluoride, and tribromide.

When vinyl chloride is copolymerized with comonomers, a very wide selection is available among which can be cited styrene, acrylonitrile, acrylamide, dichloroethylene 1-1, the acrylates, the methylacrylates, and the vinyl esters of which the laurate, stearate, and acetate are exemplary. For effective operation the proportion of peroxide, expressed as active oxygen, to monomer should be on the order of 0.0005 to 0.2% by weight, and preferably between about 0.001 and 0.1%. The titanium compound should, for effective operation, be present in the ratio of one-fifth to five moles to each mole of peroxide.

The catalytic system as defined is useful in a wide variety of processes and techniques, for instance those described in French Pats. 1,079,772; 1,257,780; 1,357,736; 1,382,072; 1,436,744; 1,436,464; 1,493,610 and in French application No. PV 67,216. Those patents are largely devoted to polymerization in mass but the catalytic system is also useful in processes carried out in a medium which precipitates the polymer but dissolves in or is miscible with the monomer. A wide variety of media have been used for this purpose, especially alcohols such as butanol, propanol and isopropanol.

The products produced by this process, using the novel catalytic system, are noteworthy in that they are improved in the properties hereinabove indicated and in that they have a very high proportion of syndiotactic molecules which contribute to the improvement.

The following examples illustrate the invention without limiting the generality of what is elsewhere herein stated.

EXAMPLE 1

A one liter autoclave provided with a water jacket and a stainless steel agitator received a solution of 600 mg. of TiCl₃ containing 30% of Ti³⁺ in 36 ml. of methanol, then 350 g. of vinyl chloride. After purging the autoclave by releasing 50 g. of vinyl chloride, the autoclave was pressurized with nitrogen R, less than 50 parts by volume per million of oxygen, to prevent the entrance of oxygen. After cooling the contents to −28° C., 60 mg. of active oxygen were introduced as a solution of 5.65 ml. of alphachlorocaproyl peroxide in hexane. After 10 hours polymerization 180 g. of polymer, a transformation of 60% were recovered.

The product had an index of viscosity AFNOR of 382, a Fikentscher K index of 109, and a VICAT softening point (ASTM D 1525–65T) of 104° C. In the absence of the titanium compound an equally satisfactory result, either as to quality or quantity, cannot be obtained in so low a temperature range.

EXAMPLE 2

This example was carried out under the same conditions as Example 1 but substituting 600 mg. of TiCl$_3$ containing 30% Ti$^{3+}$ in 18 ml. of methanol instead of 36 ml. After 7 hours of polymerization the yield was 163 g. of polymer, a 55% conversion. The viscosity index was 315, the K index was 102, and the VICAT point was 103.5° C.

EXAMPLE 3

The conditions of Example 1 were again carried out but the reaction was stopped at the end of 5 hours. The yield was 114 g. (38%) of polymer at an hourly rate of transformation of 7.6%. The viscosity index was 246, the K index was 93.

EXAMPLE 4

The same autoclave as Example 1 received 667 mg. of TiCl$_3$ containing 27% Ti$^{3+}$ in 75 ml. of methanol, then 350 g. of vinyl chloride. After venting 50 g. of vinyl chloride to purge the oxygen in the apparatus the pressure was restored with nitrogen R. After cooling the contents to −40° C. 60 mg. of active oxygen were introduced as a 26.8 ml. solution of alpha alpha dichloropropionyl peroxide in hexane. After 3 hours of polymerization 27 g. of white polymer were recovered, a yield of 9%.

EXAMPLE 5

This example was identical with Example 3 but twice the quantities of the catalyst system were introduced being 1,334 mg. of TiCl$_3$ in 75 ml. of methanol and 120 mg. of active oxygen as a solution of alpha alpha dichloropropionyl peroxide in hexane. After 3 hours of polymerization 44 g. of polymer were recovered corresponding to a rate of transformation of 14.6%.

EXAMPLE 6

Example 4 was identically carried out at −50° C. instead of −40° C. After 3 hours of polymerization 18 g. of polymer, a yield of 6%, were recovered.

EXAMPLE 7

Example 4 was repeated at −60° C. After 4 hours of polymerization 10.5 g. of polymer, a yield of 3.5%, were recovered.

EXAMPLE 8

The autoclave of Example 1 received a solution containing 600 mg. of TiCl$_3$ containing 30% Ti$^{3+}$ in 15 ml. of methanol and 30 ml. of insopropanol and then 400 g. of vinyl chloride. After venting 100 g. of vinyl chloride to purge the oxygen from the apparatus, the pressure was restored with nitrogen R. After cooling the contents to −40° C., 60 mg. of active oxygen were introduced as a 24 ml. solution of alpha alpha dichloropropionyl peroxide in hexane. After 7 hours of polymerization under such conditions 73 g. of polymer were recoverd, a yield of 24.3%. The viscosity index was 313, the K index was 101.5.

EXAMPLE 9

A stainless steel autoclave of 20 l. capacity provided with a water jacket for the passage of hot or cold fluid and provided with a ribbon blender agitator and a lid including an inlet valve, a gas discharge valve, a security joint, and a thermometer tube between the agitator and its shaft was cooled to −15° C. and charged with a solution containing 6.65 g. of TiCl$_3$ containing 27% Ti$^{3+}$ in 150 g. of methanol and 4 kg. of vinyl chloride. After purging the oxygen by releasing 1 kg. of vinyl chloride, 350 l. of gas, the autoclave was pressurized with nitrogen R to prevent the entry of oxygen. The autoclave was cooled to −28° C. by circulating cold alcohol through the water jacket then 600 mg. of active oxygen were introduced as a solution of alpha chlorocapropyl peroxide in hexane, this solution itself being disclosed in 150 ml. of methanol. After 15 hours of polymerization at that temperature, the circulation of cold fluid was stopped then the apparatus was subjected to degassing for 2 hours under industrial vacuum, the temperature being raised to room temperature. Two kg. of perfectly white polymer, a transformation of 66.6% were recovered. It had an index of viscosity AFNOR of 350, a Fikentscher K index of 100, and a VICAT softening point of 105° C.

EXAMPLE 10

The process of Example 9 was carried out for 20 hours instead of 15 under the same conditions. The yield was 2.2 kg. of polymer, a yield of 73.3%. The viscosity index was 400, the K index was 111, the VICAT point was 104.5° C.

EXAMPLE 11

The apparatus of Example 1 received 400 g. of vinyl chloride, was purged by releasing of 100 g. of vinyl chloride, and pressurized with nitrogen R. After cooling the contents to −40° C. 600 mg. of TiCl$_3$ in 15 g. of methanol were introduced and then 60 mg. of active oxygen as a solution of alphachlorocaprylyl in hexane.

After 7 hours polymerization, 83 g. of polymer, a transformation of 27.6%, were recovered. The viscosity index was 230, the K index was 91 and the VICAT point was 106° C.

EXAMPLE 12

Example 11 was identically carried out in presence of ethanol instead of methanol. After 7 hours polymerization 73.5 g. of polymer were recovered. The viscosity index was 260, the K index was 91.

EXAMPLE 13

The polymerization is carried out in presence of a great quantity of isopropanol (precipitating medium) in which TiCl$_3$ is less soluble than in methanol.

Example 11 was identically carried out in presence of 75 g. of isopropanol instead of 15 g. methanol. After 5 hours polymerization, 51 g. of polymer, a transformation of 17% were recovered. The viscosity index was 210, the K index was 91 and the VICAT point was 106° C.

The advantages of the invention are the accomplishment of the objects of the invention, the polymers produced by this invention being materially improved in all or some of the categories stated in the objects of the invention. Another advantage of the invention is the lowering of the operable range of the process into regions which were previously unavailable because of poor quality of product or unsatisfactory yield.

As many apparent widely different embodiments of the present invention may be made without departing from the spirit and scope thereof, it is to be understood that the invention is not limited to the specific embodiments.

What is claimed is:
1. A method of making polymers of vinyl chloride which comprises subjecting a monomeric composition comprising preponderantly vinyl chloride in mass to polymerization in admixture with a catalytic system supplying active oxygen from an alpha halogenated diacyl peroxide of the formula

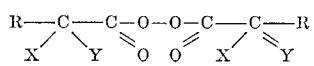

in which X is a halogen, Y is selected from the group consisting of hydrogen and halogen, R is selected from the group consisting of saturated aliphatic hydrocarbon radicals of from 1 to 10 carbon atoms, unsaturated aliphatic hydrocarbon radicals of from 1 to 10 carbon atoms, cycloalkane, cycloalkene, aromatic and heterocyclic radicals, in proportions expressed in terms of the weight of active oxygen supplied from said peroxide of from 0.0005 to 0.2% in relation to the weight of monomer, and a trivalent titanium halide in an amount of from $\frac{1}{5}$ to 5 moles of titanium halide per mole of said alpha halogeno diacyl peroxide, at a temperature between $-80°$ C. and $+10°$ C. until a vinyl chloride polymer is formed.

2. The method of claim 1 in which the diacyl peroxide is selected from the group consisting of alpha alpha dichloropropionyl peroxide, alpha chlorocaproyl peroxide, alpha chlorolauroyl peroxide, alpha chlorobutyroyl peroxide, alpha chloropropionyl peroxide, alpha chlorocapryl peroxide, alpha chlorovaleroyl peroxide, alpha chloroheptanoyl peroxide, and alpha chloroundecanoyl peroxide.

3. The method of claim 1 in which the vinyl chloride is admixed with a minor proportion of at least one monomer selected from the group consisting of the acrylates, the methacrylates, 1,1-dichloroethylene, styrene, acrylonitrile, acrylamide, and vinyl esters.

4. In the polymerization of vinyl chloride according to claim 1 in which the temperature of polymerization is between $-60°$ C. and $0°$ C.

5. The method according to claim 1 in which the titanium halide is the trichloride.

6. The method according to claim 1 in which the weight of active oxygen is from 0.001% to 0.1% of the weight of the monomer.

References Cited

UNITED STATES PATENTS

| | | | |
|---|---|---|---|
| 2,344,785 | 3/1944 | Owens et al. | 260—92.8 |
| 2,380,476 | 7/1945 | Stewart. | |
| 2,559,630 | 7/1951 | Bullitt | 260—610 |
| 2,792,423 | 5/1957 | Young et al. | |
| 3,089,865 | 5/1963 | Walther et al. | 260—92.8 |

HARRY WONG, Jr., Primary Examiner

U.S. Cl. X.R.

252—429; 260—86.3, 87.1, 87.5, 92.8